(12) United States Patent
Lung et al.

(10) Patent No.: US 7,092,064 B2
(45) Date of Patent: Aug. 15, 2006

(54) LIQUID CRYSTAL DISPLAY DEVICE AND METHOD OF MANUFACTURING THE SAME WHEREIN THE SUBSTRATE HAVING PARTICULAR SURFACE ROUGHNESS

(75) Inventors: Hsing Chj Lung, Tainan (TW); Chun Bin Wen, Tainan (TW); Hung I Tseng, Tainan (TW); Chung Kuang Wei, Tainan (TW)

(73) Assignee: Chi-Mei Optoelectronics Corp. (TW)

( * ) Notice: Subject to any disclaimer, the term of this patent is extended or adjusted under 35 U.S.C. 154(b) by 118 days.

(21) Appl. No.: 10/117,117

(22) Filed: Apr. 8, 2002

(65) Prior Publication Data

US 2003/0112406 A1    Jun. 19, 2003

(30) Foreign Application Priority Data

Dec. 18, 2001   (TW) .............................. 90131585 A

(51) Int. Cl.
*G02F 1/1333*    (2006.01)
(52) U.S. Cl. ........................ 349/158; 349/122; 349/138
(58) Field of Classification Search ................ 349/122, 349/96, 117, 75, 187, 136, 138, 158, 78
See application file for complete search history.

(56) References Cited

U.S. PATENT DOCUMENTS

| | | | | |
|---|---|---|---|---|
| 4,380,372 A | * | 4/1983 | Taguchi | 350/346 |
| 4,674,840 A | * | 6/1987 | Bennett | 349/97 |
| 4,731,282 A | * | 3/1988 | Tsukagoshi et al. | 428/220 |
| 5,283,675 A | * | 2/1994 | Ooi et al. | 359/51 |
| 5,760,954 A | * | 6/1998 | Tatsuki et al. | 359/452 |
| 5,766,493 A | * | 6/1998 | Shin | 216/23 |
| 5,892,561 A | * | 4/1999 | Suzuki et al. | 349/122 |
| 6,243,150 B1 | * | 6/2001 | Watanabe et al. | 349/65 |
| 6,259,499 B1 | * | 7/2001 | Yamanashi | 349/113 |
| 6,406,824 B1 | * | 6/2002 | Okamura et al. | 430/67 |
| 6,468,438 B1 | * | 10/2002 | Shin et al. | 216/84 |
| 6,567,141 B1 | * | 5/2003 | Kaneko et al. | 349/117 |
| 6,623,861 B1 | * | 9/2003 | Martin et al. | 428/412 |
| 2002/0196405 A1 | * | 12/2002 | Colgan et al. | 349/187 |
| 2003/0180503 A1 | * | 9/2003 | Yamato et al. | 428/141 |

* cited by examiner

*Primary Examiner*—Andrew Schechter
*Assistant Examiner*—Mike Qi

(57) ABSTRACT

A liquid crystal display device includes a pair of transparent substrates, a liquid crystal layer sandwiched between inner surfaces of the transparent substrates, and a pair of optical films each attached on an outer surface of the transparent substrate via a transparent adhesive layer. The transparent adhesive layer has an outer surface facing the optical film. The outer surface of each transparent substrate has a first Ra surface roughness, and the outer surface of the adhesive layer has a second Ra surface roughness which is smaller than the first Ra surface roughness. The present invention further provides a method for manufacturing the liquid crystal display device.

26 Claims, 4 Drawing Sheets

LIQUID CRYSTAL DISPLAY DEVICE AND METHOD OF MANUFACTURING THE SAME WHEREIN THE SUBSTRATE HAVING PARTICULAR SURFACE ROUGHNESS

BACKGROUND OF THE INVENTION

1. Field of the Invention

The present invention relates to a liquid crystal display device and a method of manufacturing the same, and more particularly to a weight-reduced liquid crystal display device and a method of manufacturing the same.

2. Description of the Related Art

To achieve the goals of small size and low power consumption, flat panel display devices such as LCD (Liquid Crystal Display), PDP (Plasma Display Panel), ELD (Electroluminescent Display), and VFD (Vacuum Fluorescent Display) have been introduced. In these flat panel display devices, the LCD has been most actively researched recently because of good image quality and low power consumption in spite of some disadvantages. Although portable televisions and notebook computers having the LCD have been marketed, there are various problems which need to be solved. Because televisions and computers have become portable electronic products, the reduction of the size and weight is one of the important goals in the LCD research.

There are various methods to reduce the size and weight of the LCD. It is, however, difficult to reduce numbers of the components of the LCD. In addition, the weight and size of the components are so small that the weight and size of the components can hardly be reduced further. Fortunately, the weight of the glass substrate which is one of the basic components of the LCD can be reduced further. Moreover, the weight reduction of the glass substrate becomes important because it occupies a large portion of the total weight of the LCD.

In the conventional technique, transparent glass is used for the substrates in manufacturing the liquid crystal display. Since conventionally used glass is comparatively thick, it is protected against physical or thermal impacts during processing procedure. To reduce the weight of LCD devices, a single substrate which is 0.6 mm in thickness is adopted. However, if a thin substrate less than 0.6 mm in thickness is used from the initial stage, the yield will decrease due to damage or deformation. For the lower substrate manufacturing and the liquid crystal filling processes, the process of heating or cooling between 200–300° C. occurs more than ten times. In addition, a high-speed rotation process for the rinsing or coating process is repeated for several times. For the foregoing limitations, the glass substrates should not be too thin before the liquid crystal is injected into the space between two glass substrates to form an LCD cell.

The manufacture process of a conventional LCD device is shown in FIG. 1. In step 101, the upper and lower substrates are manufactured. In step 102, the upper and lower substrates are oppositely positioned and joined to form an LCD cell. In step 103, the liquid crystal is injected into the space between the upper and lower substrates. In step 104, a lapping process is conducted to reduce the thickness of the upper and lower substrates. In step 105, the outer surfaces of the upper and lower substrates are polished. In step 106, a pair of optical films are attached on the upper and lower substrates, respectively. After step 104, the outer surfaces of the glass substrates become quite rough. Therefore, in this conventional method, the lapped thin glass substrates will be polished to smooth the surfaces of the glass substrates, and then the optical films are attached to the substrates by an adhesive layer. However, in the industrial manufacturing process, more manufacturing steps lead to higher possibility of producing defect products and increasing manufacturing cost. Therefore, there exits a need for a simplified manufacturing process which can be used to reduce the weight of glass substrates thereby reducing the manufacturing cost and the failure rate of the products.

SUMMARY OF THE INVENTION

It is an object of the present invention to provide a weight-reduced liquid crystal display device.

It is another object of the present invention to provide a simplified method for reducing the thickness of the substrates of liquid crystal display devices thereby increasing the yield rate of the liquid crystal display devices and reducing the manufacturing cost therefore.

To achieve the above listed and other objects, the present invention provides a liquid crystal display device including a pair of transparent substrates, a liquid crystal layer sandwiched between the inner surfaces of the transparent substrates, and a pair of transparent layers formed on the outer surfaces of the transparent substrates. The transparent layer has an inner surface facing the transparent substrate and an outer surface opposing to the inner surface. The outer surface of each transparent substrate has a first Ra surface roughness, and the outer surface of the transparent layer has a second Ra surface roughness which is smaller than the first Ra surface roughness. The first Ra surface roughness is in the range between about 0.1 mm and about 0.001 mm, for example, 0.035 mm. It is preferred that the transparent layer has a light transmission rate of more than about 99%. The transparent layer is preferably an adhesive layer such that a pair of optical films can be attached on the outer surfaces of the adhesive layer. The optical film includes a polarizer or/and a retardation film.

While the transparent substrate has a refractive index of $n_g$, the transparent adhesive layer preferably has a refractive index in the range between about 1 and about $(2n_g-1)$, and more preferably has a refractive index substantially the same as the refractive index of the transparent substrate.

The present invention further provides a method for manufacturing a liquid crystal display device. First, a liquid crystal display cell which comprises a pair of transparent substrates and a liquid crystal layer sandwiched between inner surfaces of the transparent substrates is provided. Next, the thickness of the transparent substrates is reduced by lapping or etching such that the outer surfaces of the transparent substrates have a first Ra surface roughness. Then, a transparent layer is formed on each of the outer surfaces of the transparent substrates, wherein the transparent layer has an inner surface facing the transparent substrate and an outer surface with a second Ra surface roughness which is smaller than the first Ra surface roughness. It is preferred that the transparent layer is adhesive so that a pair of optical films can be attached on the outer surfaces of the adhesive layers. The method described above can eliminate the polishing step after the glass substrates are lapped or etched, thereby saving the manufacturing cost and achieving a lower failure rate.

BRIEF DESCRIPTION OF THE DRAWINGS

Other objects, advantages, and novel features of the invention will become more apparent from the following detailed description when taken in conjunction with the accompanying drawings.

DETAILED DESCRIPTION OF THE PREFERRED EMBODIMENT

Figure 2:
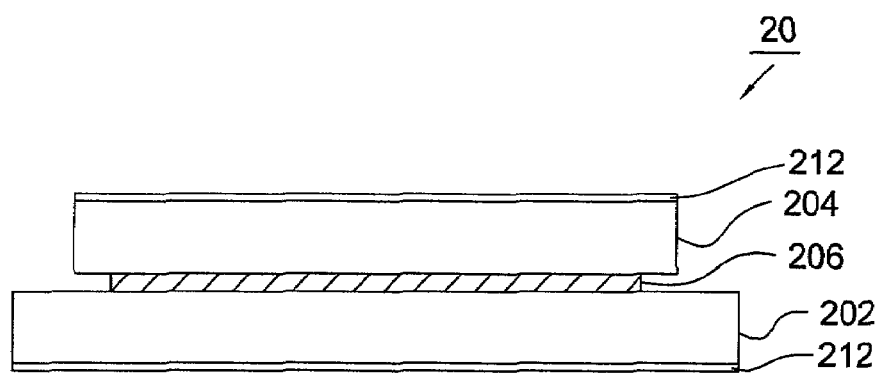
FIG. 2 is a cross-sectional view of a liquid crystal display device according to one preferred embodiment of the present invention.
Figure 3:
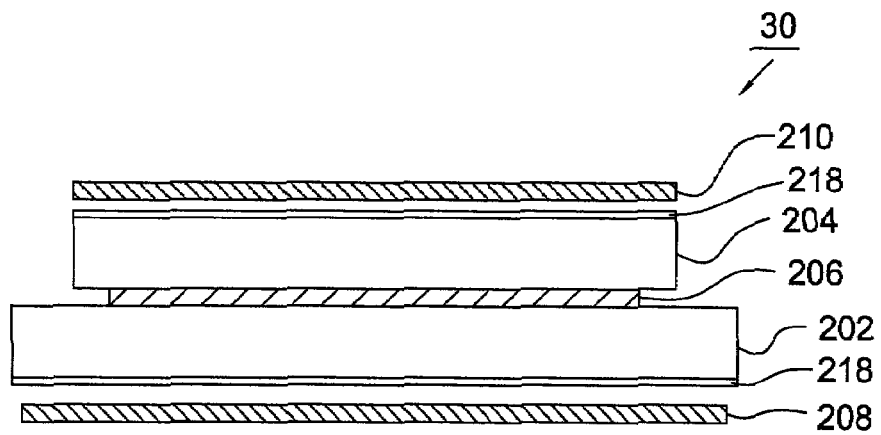
FIG. 3 is a cross-sectional view of a liquid crystal display device according to another preferred embodiment of the present invention.

FIG. 2 shows a liquid crystal display device 20 according to a first embodiment of the present invention. The liquid crystal display device 20 includes a transparent lower substrate 202, a transparent upper substrate 204, a liquid crystal layer 206 sandwiched between inner surfaces of the transparent substrates, and a transparent layer 212 formed on the outer surfaces of the transparent substrates 202 and 204. The transparent layer 212 has an inner surface facing the transparent substrate 202, 204 and an outer surface opposing to the inner surface. The outer surface of each transparent substrate has a first Ra surface roughness, and the outer surface of the transparent layer has a second Ra surface roughness which is smaller than the first Ra surface roughness. The first Ra surface roughness is in the range between about 0.1 mm and about 0.001 mm, for example, 0.035 mm. It is preferred that the transparent layer has a light transmission rate of more than about 99%. The term "Ra" used here denotes "center line average surface roughness" which is measured by a stylus profilometry. FIG. 3 shows a liquid crystal display device 30 according to a second embodiment of the present invention. The liquid crystal display device 30 includes a transparent lower substrate 202 and a transparent upper substrate 204, a liquid crystal layer 206 sandwiched between inner surfaces of the transparent substrates, and an upper optical film 208 and a lower optical film 210 which are disposed on the outer surfaces of transparent substrates 202 and 204 by a transparent adhesive layer 218, respectively. The optical film includes a polarizer or/and a retardation film.

Figure 4:
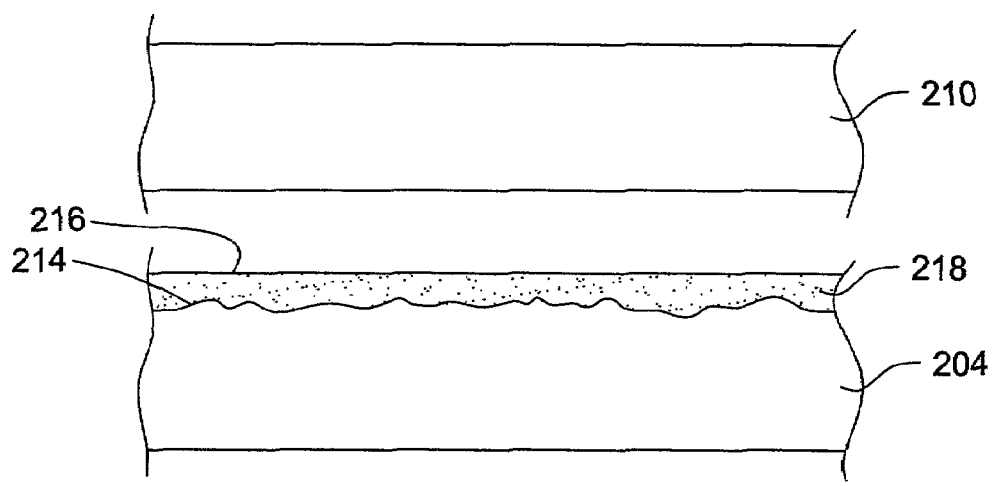
FIG. 4 is a cross-sectional view showing a portion of the liquid crystal display device in FIG. 3 on an enlarged scale.

As shown in FIG. 4, the polarizer 210 is attached on the outer surface 214 of the transparent substrate 204 by a transparent adhesive layer 218. The transparent adhesive layer 218 has an outer surface 216 facing to the polarizer 210. The outer surface 214 of the transparent substrate 204 has a first Ra surface roughness, and the outer surface 216 of the transparent adhesive layer 218 has a second Ra surface roughness which is smaller than the first Ra surface roughness. The first Ra surface roughness is in the range from about 0.1 mm and about 0.001 mm, for example, 0.035 mm. It should be noted that although only the upper substrate 204 and the transparent adhesive layer 218 are illustrated in FIG. 4, the lower substrate 202 and the transparent adhesive layer 218 are in the same relative positions and have the same surface roughness.

The transparent adhesive layer 218 used in the present invention preferably has optical transparency, and more preferably has a light transmission rate of more than 99%. Besides, the transparent adhesive layer 218 preferably has weather resistance such that it is not liable to deteriorate because of the variation of the temperature or humidity. Additionally, the transparent adhesive layer 218 preferably has an adhesive characteristic for securely attaching the optical film 210 to the transparent substrate 204, and fitting the surfaces of the transparent substrate 204 and the optical film 210 closely. The transparent adhesive layer may comprise a transparent adhesive with appropriate polymers, preferably an acrylic adhesive.

Generally speaking, the transparent substrate is made of glass. For not affecting the light transmission rate of the whole liquid crystal display device, it is preferred that the transparent layer 212 or the transparent adhesive layer 218 has a refractive index close to the refractive index of the glass substrate. While the transparent substrate has a refractive index of $n_g$, the transparent layer 212 or the transparent adhesive layer 218 preferably has a refractive index in the range between about 1 and about $(2n_g-1)$, and more preferably has a refractive index substantially the same as the refractive index of the transparent substrate.

Figure 5:
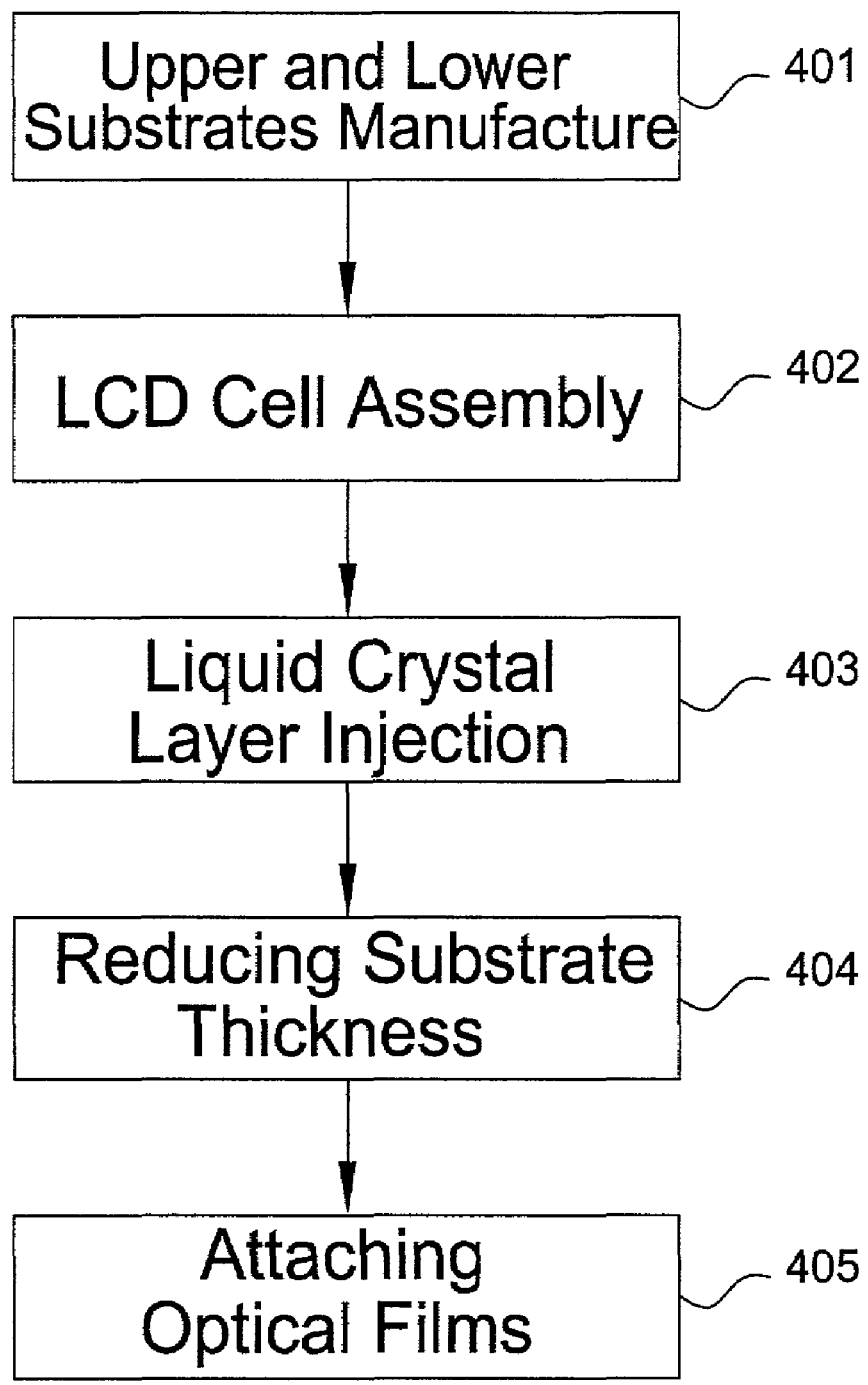
FIG. 5 is a flow chart showing a process of fabricating a liquid crystal display device according to the present invention.
Figure 6A:
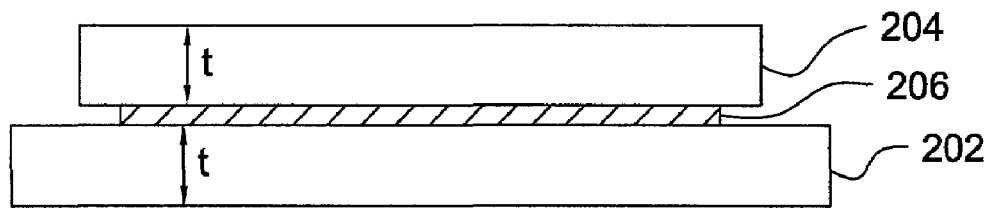
FIG. 6A is a cross-sectional view of a liquid crystal display cell before being reduced according to the present invention.
Figure 6B:
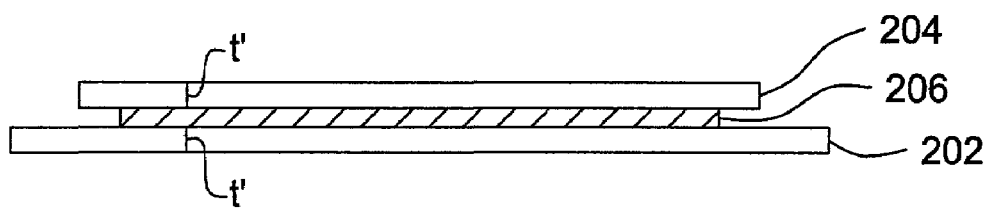
FIG. 6B is a cross-sectional view of a reduced liquid crystal display cell according to the present invention.

The present invention further provides a method for manufacturing a liquid crystal display. Referring to FIG. 5, in step 401, the upper and lower substrates are prepared. For example, the thin film transistors and circuits are formed on the lower substrate 202, and the color filters are patterned onto the upper substrate 204. In step 402, the two substrates 202 and 204 are oppositely positioned and assembled into a liquid crystal display cell. In step 403, the liquid crystal is injected into the space between the inner surfaces of the transparent substrates to form a liquid crystal layer 206. Then, the thickness of the substrate is uniformly reduced by physical lapping or chemical etching (in step 404). Referring to FIGS. 6A and 6B, the thickness reducing step reduces the thickness of the substrate from t shown in FIG. 6A to t' shown in FIG. 6B (t<t'), thereby greatly reducing the weight of the transparent substrate. However, the reducing step also make the outer surface of the substrate become very rough. In this moment, the outer surface 214 of the transparent substrate has a first Ra surface roughness. Thereafter, a transparent layer 212 is formed on the outer surfaces of the transparent substrates such that the outer surface 216 of the transparent layer 212 is quite smooth. The outer surface 216 of the transparent layer 212 has a second Ra surface roughness. The second Ra surface roughness is much smaller than the first Ra surface roughness.

According to another embodiment of the present invention, the transparent layer is preferably adhesive such that a pair of optical films 208 and 210 can be attached on the outer surfaces of the transparent substrates 202 and 204 by the transparent adhesive layers in step 405.

Figure 1:
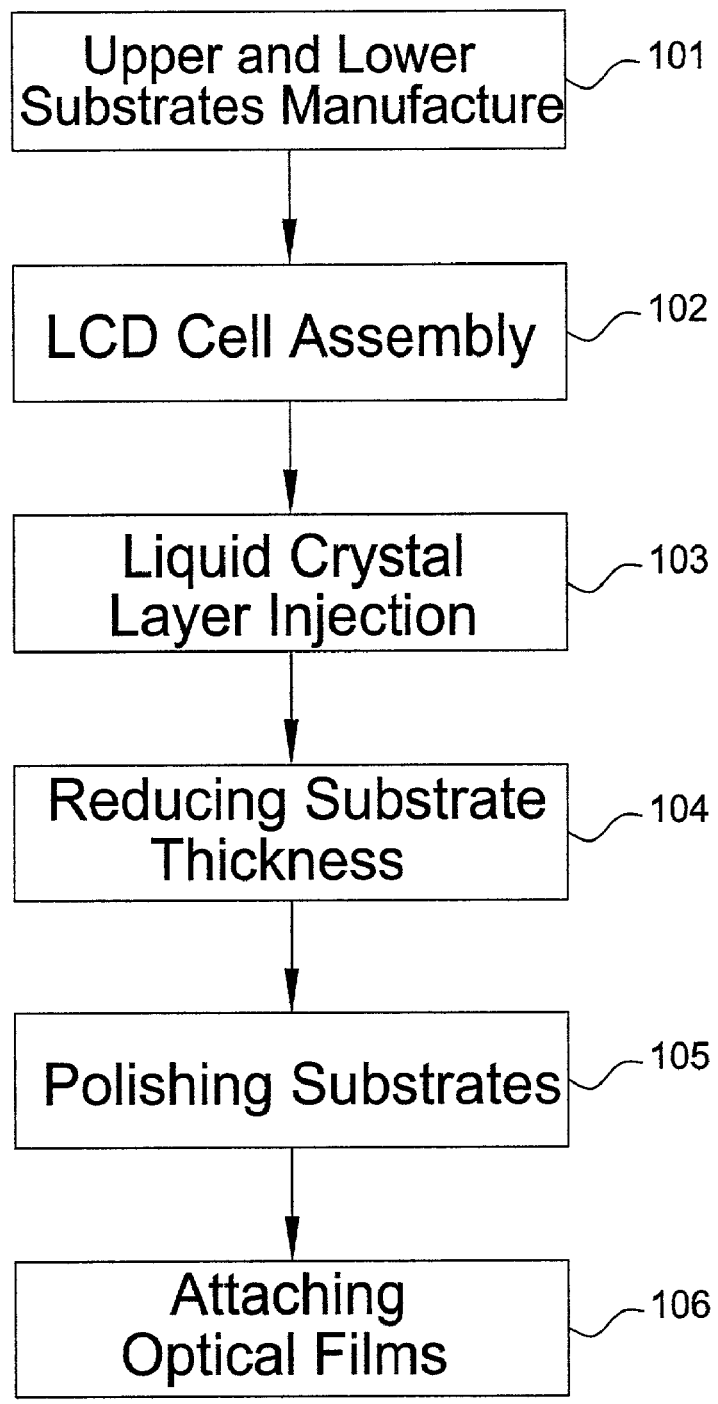
FIG. 1 is a flow chart showing a process of fabricating a conventional liquid crystal display device.

Compared with the conventional method, the method described above can eliminate the polishing step after reducing the thickness of the transparent substrate (referring to step 105 in FIG. 1). According to the conventional method, the outer surface of the transparent substrate becomes substantially smooth after polishing. However, according to the method disclosed in the present invention, although the outer surface 214 of the transparent substrate 204 becomes quite rough because of eliminating the polishing step, the light transmission of the whole liquid crystal display device is still not affected by the roughness of the outer surface 214 of the transparent substrate 204 because of the transparent layer 212. It is preferred to have a thin transparent layer, but transparent layer should be thick enough to fill up the rough outer surface 214 of the transparent substrate 204 and planarize the rough outer surface 214 to form a flat surface.

As mentioned above, the method for manufacturing liquid crystal display devices according to the present invention eliminates the polishing step. It not only saves cost of polishing, but also shortens the manufacturing time. It also reduces the failure rate due to the polishing step thereby increasing the throughput.

Although the present invention has been explained in relation to its preferred embodiments, it is to be understood that many other possible modifications and variations can be made without departing from the spirit and scope of the invention as hereinafter claimed.

What is claimed is:

1. A liquid crystal display device, comprising:
   a pair of transparent substrates;
   a liquid crystal layer sandwiched between inner surfaces of the transparent substrates; and
   a transparent layer formed on the outer surfaces of transparent substrates, the transparent layer having an inner surface facing the transparent substrate and an outer surface opposing to the inner surface,
   wherein the whole outer surface of each transparent substrate has a first Ra surface roughness resulted from a thickness reduction process of the transparent substrates and the whole outer surface of the transparent layer has a second Ra surface roughness which is smaller than the first Ra surface roughness, where Ra denotes the center line average surface roughness; and
   wherein the first Ra surface roughness is about 0.035 mm.

2. The liquid crystal display device as claimed in claim 1, wherein the transparent substrate has a refractive index of $n_g$ and the transparent layer has a refractive index in the range between about 1 and about ($2n_g-1$).

3. The liquid crystal display device as claimed in claim 2, wherein the refractive index of the transparent layer is substantially the same as the refractive index of the transparent substrate.

4. The liquid crystal display device as claimed in claim 1, wherein the transparent layer has a light transmission rate of more than about 99%.

5. The liquid crystal display device as claimed in claim 1, wherein the transparent layer has a thickness sufficient to planarize the outer surface of the transparent substrate.

6. The liquid crystal display device as claimed in claim 1, wherein the transparent layer is a transparent adhesive layer.

7. The liquid crystal display device as claimed in claim 6, further comprising a pair of optical films, each attached on the outer surface of the transparent substrate via the transparent adhesive layer.

8. The liquid crystal display device as claimed in claim 7, wherein the optical film comprises a polarizer.

9. The liquid crystal display device as claimed in claim 7, wherein the optical film comprises a retardation film.

10. The liquid crystal display device as claimed in claim 6, wherein the transparent substrate has a refractive index of $n_g$ and the transparent adhesive layer has a refractive index in the range between about 1 and about ($2n_g-1$).

11. The liquid crystal display device as claimed in claim 6, wherein the refractive index of the transparent adhesive layer is substantially the same as the refractive index of the transparent substrate.

12. The liquid crystal display device as claimed in claim 6, wherein the transparent adhesive layer has a light transmission rate of more than about 99%.

13. The liquid crystal display device as claimed in claim 6, wherein the transparent adhesive layer has a thickness sufficient to planarize the outer surface of the transparent substrate.

14. A liquid crystal display device, comprising:
   a pair of transparent substrates;
   a liquid crystal layer sandwiched between inner surfaces of the transparent substrates; and
   a transparent layer formed on the outer surfaces of transparent substrates, the transparent layer having an inner surface facing the transparent substrate and an outer surface opposing to the inner surface,
   wherein
   the outer surface of each transparent substrate comprises multiple crest and troughs, said creses crests having various heights, and said troughs having various depths, said crests and troughs in the entire said outer surface defining a first Ra surface roughness; and
   the entire outer surface of the transparent layer has a second Ra surface roughness which is smaller than the first Ra surface roughness, where Ra denotes the center line average surface roughness.

15. The liquid crystal display device as claimed in claim 14, wherein the first Ra surface roughness is in the range between about 0.1 mm and about 0.001 mm.

16. The liquid crystal display device as claimed in claim 15, wherein the first Ra surface roughness is about 0.035 mm.

17. The liquid crystal display device as claimed in claim 14, wherein the transparent substrate has a refractive index of $n_g$ and the transparent layer has a refractive index in the range between about 1 and about ($2n_g-1$).

18. The liquid crystal display device as claimed in claim 17, wherein the refractive index of the transparent layer is substantially the same as the refractive index of the transparent substrate.

19. The liquid crystal display device as claimed in claim 14, wherein the transparent layer has a light transmission rate of more than about 99%.

20. The liquid crystal display device as claimed in claim 14, wherein the transparent layer has a thickness sufficient to planarize the outer surface of the transparent substrate.

21. The liquid crystal display device as claimed in claim 14, wherein the transparent layer is a transparent adhesive layer.

22. The liquid crystal display device as claimed in claim 21, further comprising a pair of optical films, each attached on the outer surface of the transparent substrate via the transparent adhesive layer.

23. The liquid crystal display device as claimed in claim 22, wherein the optical film comprises a polarizer.

24. The liquid crystal display device as claimed in claim 22, wherein the optical film comprises a retardation film.

25. The liquid crystal display device as claimed in claim 21, wherein the transparent substrate has a refractive index of $n_g$ and the transparent adhesive layer has a refractive index in the range between about 1 and about ($2n_g-1$).

26. The liquid crystal display device as claimed in claim 14, wherein the first Ra surface roughness is in the range between about 0.035 mm and about 0.001 mm.

* * * * *